March 4, 1969
C. T. MINNIEAR
3,430,347
EXTENSION TRAMMEL
Filed Sept. 15, 1967
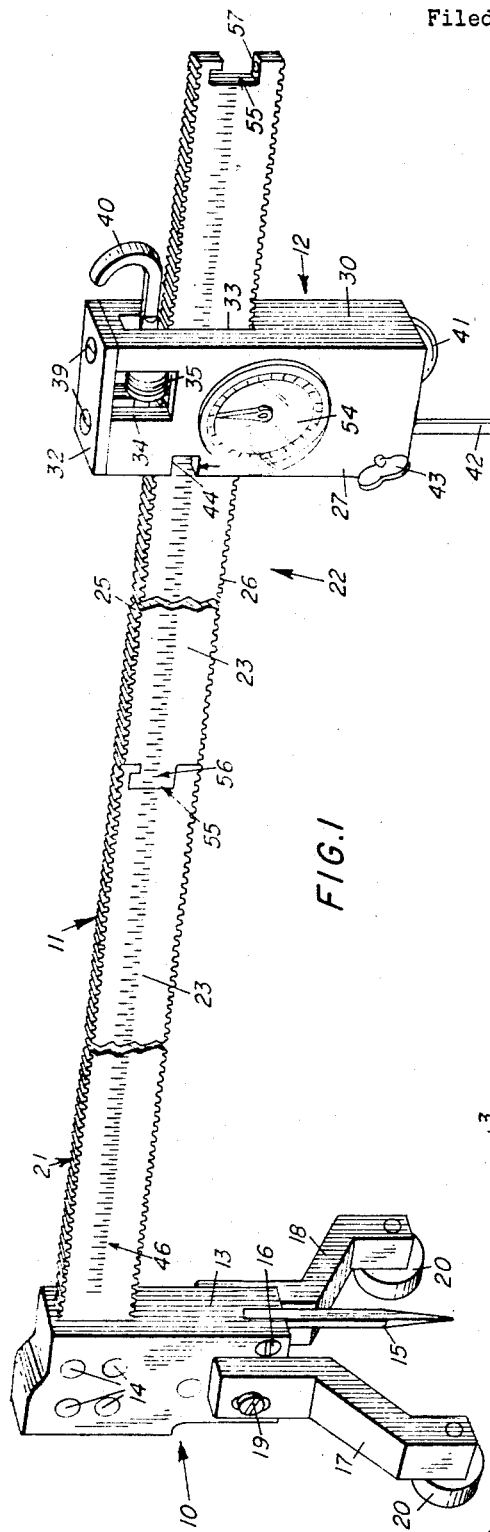
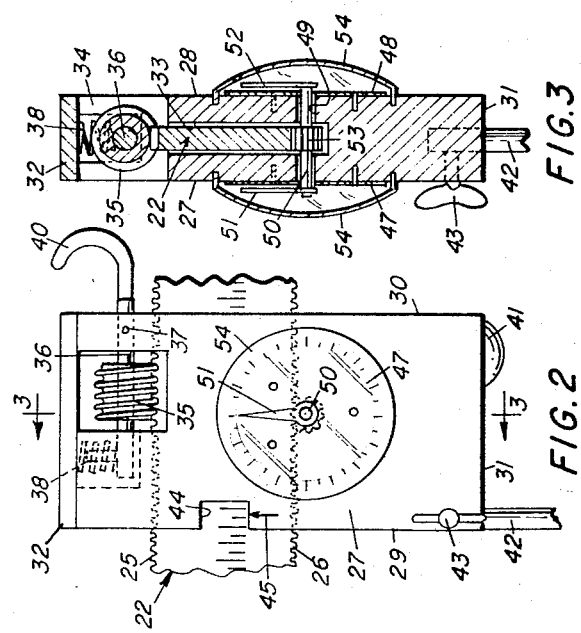
INVENTOR
CLARENCE T. MINNIEAR
BY Christen, Sabel, O'Brien & Caldwell
ATTORNEYS

United States Patent Office 3,430,347
Patented Mar. 4, 1969

3,430,347
EXTENSION TRAMMEL
Clarence T. Minniear, 2308 Happy Hollow Road,
West Lafayette, Ind. 47906
Filed Sept. 15, 1967, Ser. No. 667,912
U.S. Cl. 33—27       4 Claims
Int. Cl. B43l 11/00

ABSTRACT OF THE DISCLOSURE

A beam trammel having a plurality of extension arms also includes a direct reading scale mechanism visible on both sides of the trammel and a helical gear engageable and disengageable with a rack on the beam for fine and coarse adjustment of the movable scriber.

---

This invention relates to tools for use by construction workers such as carpenters, masons and others whose work necessitates the laying out of patterns requiring the scribing of circular lines of relatively large radius about any given point.

One of the features of the present invention is the provision of a direct reading scale for a trammel having an adjustable radius.

Another feature of the invention is the provision of a trammel having extension sections enabling the tool to be disassembled for convenience in carrying and having a direct reading dial indicator means capable of providing accurate measurements of the radius laid out by the tool regardless of whether one or more of the extension sections is used.

Still another feature of the invention is the provision of a simple scale reading mechanism for a trammel or other similar device which may be read from either side of the mechanism.

Still another object of the invention is the provision of a movable scribing point holder having a scale reading mechanism for cooperation with the arm of a trammel which scale mechanism is capable of precise measurements of the distance to be scribed but which may also be quickly and easily detached from the arm for easy adjustment of the rough setting.

Other objects and advantages will be apparent to those skilled in the art after reading the following specification in connection with the annexed drawings, in which:

FIGURE 1 is a perspective view of a preferred form of apparatus constructed in accordance with the present invention;

FIGURE 2 is a side view of the indicating mechanism shown in FIGURE 1 with the extension arm of the tool broken away;

FIGURE 3 is a sectional view taken on the line 3—3 of FIGURE 2;

FIGURE 4 is a side view of a frequent of the trammel arm showing the connection between an extension portion and the main arm of between two extension portions; and FIGURE 5 is a cross-section taken on the line 5—5 of FIGURE 4.

In the drawings the numeral 10 indicates generally a centering head having an extension arm, indicated generally by numeral 11, which supports the movable measuring and scribing head, indicated generally by numeral 12. The measuring head comprises a generally rectangular block of metal or other suitable material 13 having a rectangularly recessed portion near the top into which is fitted a horizontally extending arm 11 which may be secured in place therein by means of the bolts or rivets 14. At the lower end of the block 13 an upwardly extending recess is provided, into which an elongated scribing point 15 is slidably inserted, this point being vertically adjustable within the recess and held in place at the desired elevation by means of a suitable thumb screw type of set screw 16. In addition, in view of the size of the trammel, and in order to make it possible for one person to operate the tool, the centering head may be stabilized as by means of a pair of downwardly and outwardly extending legs 17 and 18, secured to the head as by means of a single through-bolt 19. Each of the legs may be provided at their lower ends with rollers 20, and the positioning of the point 15 may be such that it projects downwardly below the plane of the lower portions of the rollers a sufficient amount such that the point will penetrate slightly into the surface to be scribed while the major portion of the weight of the device is placed upon the rollers of the supporting legs.

While the arm 11 may comprise a single elongated bar of metal or other similar material having a length great enough to scribe arcs of the largest radius desired, it may be preferable to make it in several sections of short lengths with a fixed section 21, having one end attached to the block 13 and one or more extensions 22, depending upon the radius of circles to be scribed, each of these sections being identical, for interchangeable connection one with another and with the fixed section 21.

As will be observed in FIGURE 5, the arm 21 and the extension arms 22 are all rectangular in cross-section having flat parallel vertical sides 23 and 24. The upper surface of the arm and extensions is provided with a series of transverse grooves 25 extending along their entire length and disposed at a slight angle to provide a continuous screw thread for cooperative engagement with a helically grooved operating member on the measuring and scribing head, as will be explained later. The lower surface of the arm 21 and the extensions is also provided with a series of parallel grooves 26 extending at right angles to the sides of the arm for cooperation with a pinion member on the measuring head.

The measuring and scribing head 12 comprises essentially a rectangular block of metal or similar material having parallel side faces 27 and 28, end faces 29 and 30, a bottom surface 31 and a removable cover plate 32. The block is also provided with a longitudinally extending slot 33 which extends downwardly from the top portion of the block and enables the head to slidably encircle the arm 21 and extensions 22. At the extreme upper portion of the block there is also provided a transversely extending slotted portion 34 within which there is positioned a helically threaded actuating member 35. This member is provided with an axially extending bore to enable it to be revolubly supported upon a shaft 36, which shaft is pivotally mounted on a pin 37 to enable the actuator to swing about the axis of the pin in a vertical direction into and out of engagement with the grooves 25 on the upper surface of the arm and extensions. Shaft 36 extends forwardly into the slot 33 for engagement with a biassing means, such as a coil spring 38, positioned under the cover 32 to urge the shaft downwardly for normal engagement of the actuator with the grooves 25, the cover being held in place by means of screws 39, while the other end of the shaft is bent upwardly to form a handle portion 40 for disengaging the actuator when it is desired to move the measuring head rapidly to a predetermined position.

For convenience in moving the head a projecting button 41 may be attached to the bottom. Also extending downwardly from a suitable recess provided in the head is a second scriber point 42 which is removably secured in the recess by means of a manually operable set screw 43 threadedly received within an opening in one side of the head. While one or the other of the end faces 29 and 30 could be used as a reference line in positioning the measuring head, it is preferable to provide a transversely extending slot 44 in one of the end portions of the head so that an indicia line 45 may be placed in vertical alignment with the scriber point 42 for direct reading of a scale 46 on the arm 21 and extensions 22 marking the actual distance from the scriber point 15.

In addition to the direct reading of scale 46 by means of the marker 45, a vernier scale means is also provided comprising two identical circular scales 47 and 48 provided on opposite faces 27 and 28 of the measuring head. The center of these scales is located slightly below the level of the track formed by the grooves 26 on the underside of the arm and extensions and a transversely extending bore 49 extends through the block at this point to serve as a bearing for shaft 50 which projects outwardly a short distance on each side of the block to support the pointers 51 and 52 cooperating with the respective scales. Fixed to the center of the shaft is a pinion 53 which engages with the groove track 26, while for protection a pair of transparent covers 54 may be positioned over the pointers and scale.

It will be obvious that extensions 22 could be of various lengths so long as their cross-sectional configuration is identical with that of the arm 21 attached to the centering head and the grooves at the upper and lower surfaces of these extensions are arranged to operate as continuations of the similar grooves provided thereon. In order to detachably connect the extensions with the main arm and with each other, one end of the arm 21 is provided with a generally L-shaped slot, indicated generally by numeral 55, and one end of each of the extensions is provided with a matching generally L-shaped projecting portion, indicated generally by numeral 56, both the slot and projection extending in a transverse direction to enable the extension to be fitted into the fixed arm by sidewise engagement and disengagement between the two. To maintain longitudinal alignment each projecting portion 56 may be provided with a vertically extending threaded opening 57 to receive a centering screw 58 extending upwardly through a corresponding opening provided in the lower portion of each L-shaped slot 55.

Having described one form in which the invention may be practiced, it will be apparent to those skilled in the art that various improvements and modifications may be made which would come within the scope of the annexed claims.

I claim:

1. Apparatus for scribing arcs of infinitely variable radii, comprising first scribing means having a vertically depending scriber point for maintaining a center location, second scribing means having a scriber point for marking an arc about said center location, elongated arm means fixedly connected with the first scribing means and longitudinally movably connected with the second scribing means, the second scribing means including movable indicia means including a gear element rotatably mounted in a fixed position on the second scribing means for operative engagement with a longitudinally extending rack on the arm means to be continuously responsive to said relative longitudinal movement with respect to the arm means for indicating the radius of an arc to be marked, said second scribing means also including an elongated handle pivotally attached at one end thereof to the second scribing means and extending parallel with the arm means, and a manually operable helical gear actuator rotatably supported on said handle intermediate the ends thereof for operative engagement with a longitudinally extending rack on the arm means for gradual adjustment of the second scribing means, said handle being movable away from said arm means for disengaging said actuator for rapid movement of the second scribing means said second scribing means comprises a body portion having opposite sides disposed on each side of the arm means, said movable indicia means includes a pair of scale means disposed one on each of said opposite sides and a pair of pointers fixedly attached to shaft means extending from opposite sides of the gear element for rotation therewith, said shaft means rotatably supported by the body portion, rotation of said gear element rotates said shaft in response to longitudinal movement of second scribing means with respect to the arm means.

2. Apparatus as defined in claim 1, wherein said arm means comprises a plurality of elongated sections, said sections being provided with said groove means arranged in longitudinal alignment.

3. Apparatus as defined in claim 1, wherein biassing means is provided for urging said handle in the opposite direction.

4. Apparatus as defined in claim 1, wherein said first scribing means comprises a body having a vertical recess extending upwardly from the bottom thereof for slidably receiving the scriber point, and a pair of stabilizing legs spaced outwardly of the scriber point.

References Cited

UNITED STATES PATENTS

| 720,507 | 2/1903 | Van Horn. | |
|---|---|---|---|
| 787,766 | 4/1905 | Jensen et al. | 33—160 |
| 811,237 | 1/1906 | Merrittt | 33—159 |
| 1,345,236 | 6/1920 | Powers et al. | |
| 2,324,041 | 7/1943 | Suverkrop. | |
| 2,539,097 | 1/1951 | O'Rourke | 33—159 |
| 2,551,671 | 5/1951 | Harris. | |
| 2,832,140 | 4/1958 | Gaines. | |
| 2,867,042 | 1/1959 | Sutton | 33—158 |
| 3,156,981 | 11/1964 | Sutton | 33—158 X |
| 3,264,736 | 881966 | Novak. | |

FOREIGN PATENTS 696,947 9/1953 Great Britain.

HARRY N. HAROIAN, *Primary Examiner.*

U.S. Cl. X.R.

33—159